June 16, 1942.  J. F. LUHRS  2,286,864

MEASURING AND CONTROLLING SYSTEM

Filed Sept. 23, 1940    6 Sheets-Sheet 1

INVENTOR
JOHN F. LUHRS
BY
Raymond W. Jenkins
ATTORNEY

June 16, 1942. J. F. LUHRS 2,286,864
MEASURING AND CONTROLLING SYSTEM
Filed Sept. 23, 1940 6 Sheets-Sheet 2

INVENTOR
JOHN F. LUHRS
BY
Raymond W. Jenkins
ATTORNEY

June 16, 1942.  J. F. LUHRS  2,286,864

MEASURING AND CONTROLLING SYSTEM

Filed Sept. 23, 1940  6 Sheets-Sheet 3

INVENTOR
JOHN F. LUHRS
BY
Raymond D. Junkin
ATTORNEY

June 16, 1942.  J. F. LUHRS  2,286,864
MEASURING AND CONTROLLING SYSTEM
Filed Sept. 23, 1940  6 Sheets-Sheet 5

Inventor
JOHN F. LUHRS
By
Raymond W. Junkins
Attorney

June 16, 1942.  J. F. LUHRS  2,286,864
MEASURING AND CONTROLLING SYSTEM
Filed Sept. 23, 1940  6 Sheets-Sheet 6

Inventor
JOHN F. LUHRS
By Raymond W. Jenkins
Attorney

Patented June 16, 1942

2,286,864

UNITED STATES PATENT OFFICE 2,286,864

MEASURING AND CONTROLLING SYSTEM

John F. Luhrs, Cleveland Heights, Ohio, assignor to Bailey Meter Company, a corporation of Delaware Application September 23, 1940, Serial No. 357,848

15 Claims. (Cl. 122—448)

This invention relates to the art of measuring and/or controlling the magnitude of a variable quantity, condition, relation, etc., and particularly such a variable condition as the density of a liquid-vapor mixture, although the variable might be temperature, pressure or any physical, chemical, electrical, hydraulic, thermal or other characteristic.

I have chosen to illustrate and describe as a preferred embodiment of my invention its adaptation to the measuring and controlling of the density and other characteristics of a flowing heated fluid stream, such as the flow of hydrocarbon oil through a cracking still.

While a partially satisfactory control of the cracking operation may be had from a knowledge of the temperature, pressure and rate of flow of the fluid stream being treated, yet a knowledge of the density of the flowing stream at different points in its path is of a considerably greater value to the operator, but was not available prior to the discovery by Robert L. Rude, as claimed in his copending application Serial No. 152,860 filed July 9, 1937, now Patent No. 2,217,634 dated Oct. 8, 1940.

In the treatment of water below the critical pressure, as in a vapor generator, a knowledge of temperature, pressure and rate of flow may be sufficient for proper control, inasmuch as definite tables have been established for interrelation between temperature and pressure and from which tables the density of the liquid or vapor may be determined. However, there are no available tables for mixtures of liquid nd vapor.

In the processing of a fluid, such as petroleum hydrocarbon, a change in density of the fluid may occur through at least three causes:

1. The generation or formation of vapor of the liquid, whether or not separation from the liquid occurs.
2. Liberation of dissolved or entrained gases.
3. Molecular rearrangement as by cracking or polymerization.

The result is that no temperature-pressure-density tables may be established for any liquid, vapor, or liquid-vapor condition of such a fluid, and it is only through actual measurement of the density of a mixture of the liquid and vapor that the operator may have any reliable knowledge as to the physical condition of the fluid stream at various points in its treatment.

It will be readily apparent to those skilled in the art that the continuous determination of the density of such a flowing stream is of tremendous importance and value to an operator in controlling the heating, mean density, time of detention in a given portion of the circuit, etc. A continuous knowledge of the density of such a heated flowing stream is particularly advantageous where wide changes in density occur due to formation, generation, and/or liberation of gases, with a resulting formation of liquid-vapor mixtures, velocity changes, and varying time of detention in different portions of the fluid path. In fact, for a fixed or given volume of path, a determination of the mean density in that portion provides the only possibility of accurately determining the time that the fluid in that portion of the path is subjected to heating or treatment. By my invention I provide the requisite system and apparatus wherein such information is made available continuously to an operator, and furthermore may comprise the guiding means for automatic control of the process or treatment.

While illustrating and describing my invention as preferably adapted to the cracking of petroleum hydrocarbon, it is to be understood that it may be equally adaptable to the vaporization or treatment of other liquids and in other processes.

Figure 1:
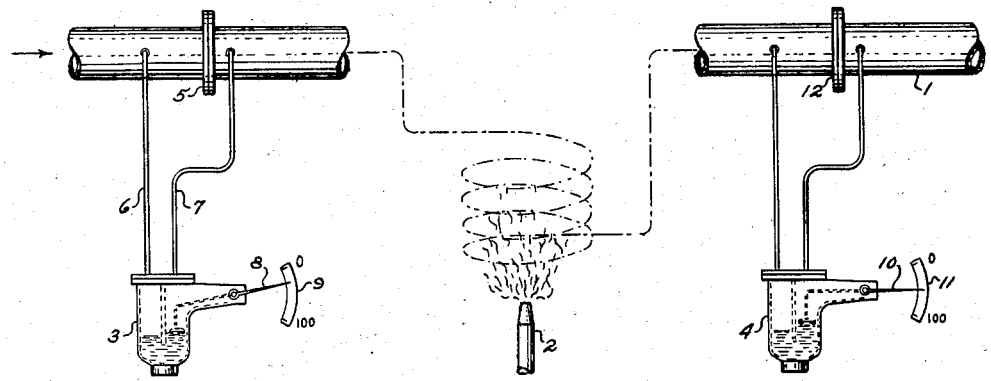
Fig. 1 is a diagrammatic representation of density measuring apparatus for a heated fluid stream.

Referring now in particular to Fig. 1, I indicate a conduit I which may be considered as comprising the once through fluid path of an oil still wherein a portion of the path is heated as by a burner 2. The rate of flow of the charge or relatively untreated hydrocarbon is continuously measured by the rate of flow meter or differential recorder 3, while a differential recorder 4 is located with reference to the conduit 1 beyond the heating means or after the flowing fluid has been subjected to heating or other processing.

The float actuated meter 3 is sensitive to the differential pressure across an obstruction such as an orifice, flow nozzle, Venturi tube, or the like, positioned in the conduit for effecting a temporary increase in the velocity of the flowing fluid. Such an orifice may be inserted in the conduit between flanges as at 5. The meter 3 is connected by pipes 6, 7 to opposite sides of the orifice 5 and comprises a liquid sealed U-tube, in one leg of which is a float operatively connected to position an indicator 8 relative to an index 9. In similar manner the indicator 10 of the meter 4 is positioned relative to an index 11; the meter 4 being responsive to the differential head across an orifice or similar restriction between the flanges 12.

The relation between volume flow rate and differential pressure (head) is:

$$Q = CM\sqrt{2gh} \qquad (1)$$

where $Q$ = cu. ft. per sec.
$C$ = coefficient of discharge
$M$ = meter constant (depends on pipe diameter and diameter of orifice hole)
$g$ = acceleration of gravity = 32.17 ft. per sec. per sec.
$h$ = differential head in ft. of the flowing fluid.

The coefficient of discharge remains substantially constant for any one ratio of orifice diameter to pipe diameter, regardless of the density or specific volume of the fluid being measured. With $C$, $M$ and $\sqrt{2g}$ all remaining constant, then $Q$ varies as the $\sqrt{h}$. Thus it will be seen that the float rise of the meters 3, 4 is independent of variation in density or specific volume of the fluid at the two points of measurement and that the reading on the indexes 9, 11 of differential head is directly indicative of volume flow. If the conduit size and orifice hole size are the same at both meter locations, then the relation of meter readings is indicative of the relation of density and specific volume.

This may readily be seen, for if it were desired to measure the flowing fluid in units of weight, Equation 1 becomes:

$$W = CM\sqrt{2ghd} \qquad (2)$$

where $W$ = rate of flow in pounds per sec.
$d$ = density in pounds per cu. ft. of the flowing fluid
$h$ = differential head in inches of a standard liquid such as water
$M$ = meter constant now including a correction to bring $h$ of Equation 1 into terms of $h$ of Equation 2.

Assuming the same weight rate of flow passing successively through two similar spaced orifices 5, 12 and with a change in density as may be caused by the heating means 2, then the density at the second orifice 12 may be determined as follows:

$$W_{12} = W_5$$
$$\sqrt{2gh_{12}d_{12}} = \sqrt{2gh_5 d_5}$$
$$\sqrt{h_{12}d_{12}} = \sqrt{h_5 d_5}$$
$$d_{12} = d_5 \times \frac{h_5}{h_{12}} \qquad (3)$$

Thus it will be observed that, knowing the density of the fluid passing the orifice 5 I may readily determine the density of the fluid passing the orifice 12, from the relation of differential pressures indicated by the meters 3, 4.

Figure 2:
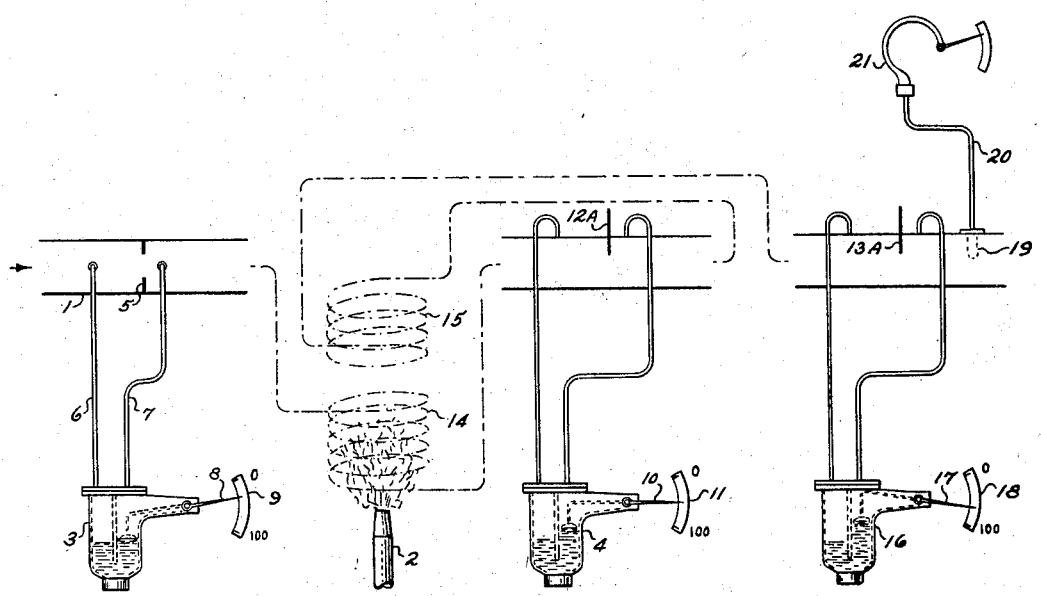
Fig. 2 is similar to Fig. 1 but includes a determination of mean density.

Referring now to Fig. 2, wherein like parts bear the same reference numerals as in Fig. 1, I indicate that after the fluid has passed through the orifice 12A it is returned to a further heating section of the still, from which it passes through a third differential pressure producing orifice 13A. The heating coil 14 will be hereinafter referred to as a first heating section, while the coil 15 will be referred to as a second heating section. In the preferred arrangement and operation of the still the section 15 is the conversion or cracking section, and the one in which it is primarily desirable to continuously determine the mean density of the fluid, as well as its time of detention or treatment in this section. For that reason I now desirably determine the mean density of the fluid in the section 15 and accomplish this through an interrelation of the differential pressures produced by the same weight flow passing successively through the orifices 5, 12A, 13A.

The same total weight of fluid must pass through the three orifices in succession so long as there is no addition to or diversion from the path intermediate the orifices. It is equally apparent that in the heating of a petroleum hydrocarbon, as by the coil 14 between the orifices 5 and 12A, there will be a change in density of the fluid between the two orifices, and furthermore that an additional heating of the fluid, as by the coil 15, will further vary the density of the fluid as at the orifice 13A relative to the orifice 12A.

Assume now that the conduit 1 is of a uniform size throughout and that the orifices 5, 12A and 13A are of a uniform opening area and coefficient or characteristic. Through the agency of the meter 16 the differential pressure existing across the orifice 13A is continuously indicated upon an index 18 by an indicator 17. The mean density of the fluid in the conversion section 15 is then obtained by averaging the density of the fluid at the orifices 12A, 13A. As for example:

$$md_{15} = \frac{d_{12A} + d_{13A}}{2} \qquad (4)$$

The density of the flowing fluid at the orifice 13A may be obtained in the same manner, relative to the density of the fluid at the orifice 5, as was previously determined (3) for the density of the flowing fluid at the orifice 12A. Simplifying this into a single operation, I have:

$$md_{15} = \frac{d_5 \times \frac{h_5}{h_{12A}} + d_5 \times \frac{h_5}{h_{13A}}}{2}$$
$$= d_5 \frac{\frac{h_5}{h_{12A}} + \frac{h_5}{h_{13A}}}{2} \qquad (5)$$

Thus the mean density of the flowing fluid in the conversion section 15 (knowing the density or specific gravity of the fluid entering the system) may be directly computed from the readings of the indexes 9, 11, 18. This, of course, on the basis that the orifices 5, 12A, 13A are the same, and that the capacity of the float meters 3, 4, 16 is the same.

Now as the specific volume increases progressively from locations 5 to 12A to 13A the differential pressure across these orifices increases in like manner, and in the operation of such a cracking still it may be that the differential pressure across an orifice 13A will be several times that across the orifice 5 if the orifice sizes are equal. I have therefore indicated at 12A, 13A of Fig. 2 that these orifices may be of an adjustable type wherein the ratio of orifice hole to pipe area may be varied externally of the conduit through suitable hand wheel or other means. The actual orifice design in terms of pounds per hour is:

$$W = 360 cf D^2 \sqrt{\frac{\max h}{\text{sp. vol.}}} \quad (6)$$

where
$W = \#/hr.$
$D$ = diameter of equivalent circular orifice hole in inches
$c$ = coefficient of discharge
$f$ = factor of approach
sp. vol. = cu. ft./lb.

Now considering that orifice 12A is so adjusted that its $cfD^2$ is different from that of orifice 5, I may then determine the density at 12A as follows:

$$d_{12A} = CR^2$$

where $$C = d_5 \left(\frac{cfD_5^2}{cfD_{12A}^2}\right)^2$$

$$R = \frac{\sqrt{h_5}}{\sqrt{h_{12A}}}$$

$$d_{12A} = d_5 \left(\frac{cfD_5^2}{cfD_{12A}^2}\right)^2 \times \left(\frac{\sqrt{h_5}}{\sqrt{h_{12A}}}\right)^2 \quad (7)$$

In similar manner I may determine the density at the orifice 13A regardless of the orifice area, so long as I take into account the $cfD^2$ of the orifice in the above manner. It will thus be seen that if the specific volume of the flowing fluid increases so rapidly that the differential head at successive orifice locations (for the same design of orifice) becomes many times the value of the differential head at the initial orifice, it would be impractical to attempt to indicate or record such differential head relative to a single index or record chart without one or more of the indications or records going beyond the capacity of the index or chart. There are two ready means of overcoming this practical difficulty, the first being an adjustment of the successive orifices, such as 12A, 13A to have new values of $cfD^2$ such that the indicator or recording pen will be kept on the chart; and the second through varying the basic capacity of the meter 4 or 16 relative to the meter 3. This latter method is accomplished by so arranging the meter 4, for example, that it requires 50% greater differential pressure to move the related pointer over full index range than in the case of meter 3. This may readily be accomplished by properly proportioning the two legs of the mercury U-tube, on one of which the float is carried. Of course it will be necessary to take such changes in capacity into account when utilizing the differential head readings in determining density or mean density.

For example, the reading of the pointer relative to the index should be on a percentage basis of whatever maximum head the meter is designed for. Then the total head corresponding to the indicator reading will be available or the proper correction may be applied. Assume that the meter U-tube 3 is so shaped that it requires 120″ water differential applied thereto to move the indicator 8 from zero to 100% travel over the index 9, and that for meters 4 and 16 it requires 250″ water differential to cause the indicator 10 to move from zero to 100% over the index 11, and 17 relative to 18. Then:

$F_3 = \%$ float travel of meter 3
$F_4 = \%$ float travel of meter 4

$$\frac{h_5}{h_{12}} = .48 \frac{F_3}{F_4}$$

substituting in (7)

$$d_{12A} = d_5 \left(\frac{cfD_5^2}{cfD_{12A}^2}\right)^2 .48 \frac{F_3}{F_4} \quad (8)$$

and $$md_{15} = \frac{.48 d_5}{2} \left[ \left(\frac{cfD_5^2}{cfD_{12A}^2}\right)^2 \frac{F_3}{F_4} + \left(\frac{cfD_5^2}{cfD_{13A}^2}\right)^2 \frac{F_3}{F_{16}} \right] \quad (9)$$

Figure 3:
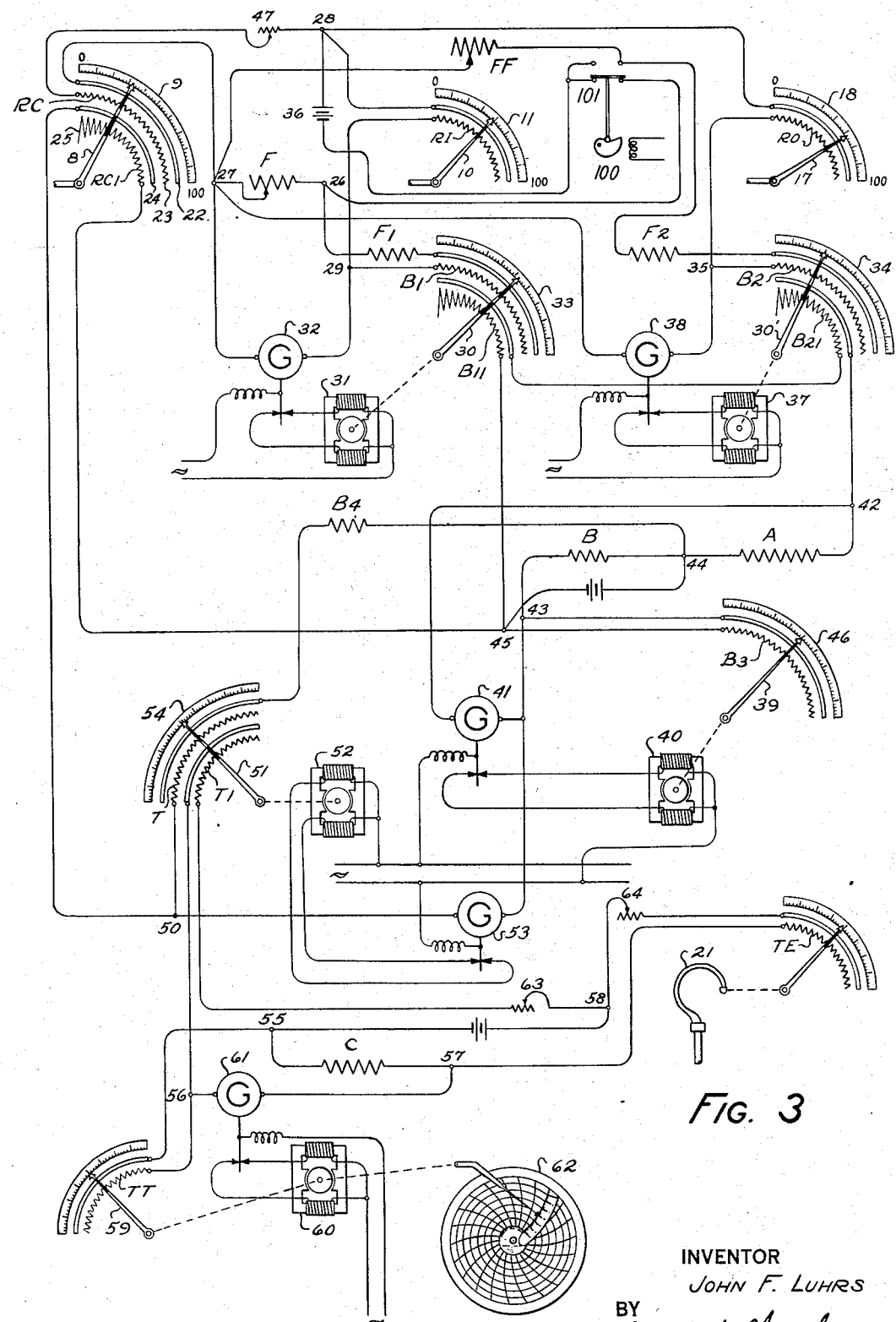
Fig. 3 is a diagrammatic arrangement of the invention in connection with a heated fluid stream.

In Fig. 3 I show in diagrammatic fashion an arrangement similar to that of Fig. 2, but adapted to give further indications valuable as a guide to operation of the system by manual or automatic means. Herein I illustrate mechanism under the control of the meters 3, 4, 16 for making directly and visually available the information I desire for the manual or automatic control of the cracking still.

In the operation of such a cracking still it is of considerable importance to determine, in addition to the mean density, the time of detention of the fluid in various portions of the fluid flow path. It is also of importance to determine the time-temperature relation of the conversion section. For example, the time that any particle remains in this section and the temperature to which it is subjected, or the temperature at which the mixture leaves the section. To determine such temperature I indicate in Fig. 2 at 19 the bulb of a gas-filled thermometer system of which 20 indicates the connecting capillary and 21 a Bourdon tube whose free end is positioned responsive to the temperature at the bulb location.

According to Equation 5 it is necessary, in determining the mean density of the conversion section, to obtain the ratio of the differential heads at orifices 5 and 12A. Then to obtain the ratio of the differential heads at orifices 5 and 13A. To then average these ratios. My invention is based in general on the use of the Wheatstone bridge through whose agency ratios may be directly obtained. With such a system the meters 3, 4, 16 may with a minimum of work position a contact arm relative to a resistance forming an arm of a Wheatsone bridge. The system lends itself readily to the remote grouping of the apparatus necessary to indicate the individual values or relations and which I desirably locate convenient to the operator for hand or automatic control of the process.

The arm 8 of meter 3 is of insulating material but carries a conducting portion adapted to continuously contact a metallic segment 22 and to movably engage a rheostat 23 providing a resistance RC representative of the position of the float of meter 3, or $F_3$. A second conducting portion on the arm 8 contacts a metallic segment 24 and movably engages a rheostat 25 providing a resistance RC1. In similar manner the arm 10 provides a resistance RI representative of $F_4$; and the arm 17 provides a resistance RO representative of $F_{16}$.

Figure 4:
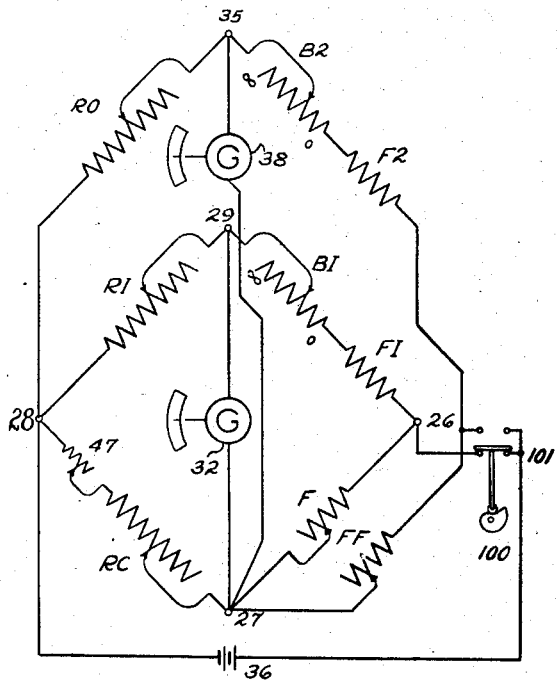
Figs. 4, 5 and 6 are simplified wiring diagrams of the composite wiring of Fig. 3.

Referring now to Fig. 4 it will be observed that the adjustable resistances RC and RI comprise two arms of a Wheatstone bridge. A third arm includes a hand adjustable resistance F, while a fourth arm includes a fixed resistance F1 and an adjustable resistance B1. The value of the resistance F1 is substantially the same as of the resistance F. The resistance B1 is known as the balancing resistance and is varied by movement of the arm 30 through the agency of the reversible synchronous motor 31 under control of a galvanometer 32.

The motor 31 is of the self-starting synchronous type of alternating current motor and is shown as having normally energized opposed fields. Should the Wheatstone bridge become unbalanced, then the needle of the galvanometer 32 will move either clockwise or counterclockwise (Fig. 3), thereby open circuiting one of the fields of the motor 31, resulting in a positioning of the arm 30 in direction and amount over the resistance B1 to balance the bridge and cause the galvanometer needle to return to neutral position. It will be understood that the necessary gear reduction is to be incorporated between the motor 31 and the arm 30 so that the arm 30 moves at a relatively slow speed.

The Wheatstone bridge thus serves to continuously determine the density at 12A through solving Equation 8. Such density is continuously indicated on the index 33 and the value $d_{12A}$ is continuously represented by the resistances B1 and B11.

Solving Equations 3 and 8

$$d_{12A} = d_5 \times \frac{h_5}{h_{12A}}$$

Now
$$RC \propto h_5$$
$$RI \propto h_{12A}$$
$$RO \propto h_{13A}$$

and it is expected that:
$$d_5 > d_{12A} > d_{13A}$$
$$h_5 < h_{12A} < h_{13A}$$
$$RC < RI < RO$$

It is known that the law of the Wheatstone bridge is:

$$\frac{RI}{B1+F1} = \frac{RC}{F}$$

$$B1 = \left(F \times \frac{RI}{RC}\right) - F1$$

When RC and RI are both zero; then the value of B1 is zero; F equalling F1.

When RI>RC then the index 33 may be arranged to read the density $d_{12A}$ directly. The resistance B1 will tend to vary from 0 to ∞. However, as the value of resistance B11 is to be directly representative of $d_{12A}$ the rheostat B11 must be shaped as the reciprocal of RI/RC or as RC/RI, and will tend to vary as the reciprocal of 0 to ∞.

In like manner the value of $d_{13A}$ may be indicated on the index 34 and be continuously represented by the value of the resistance B21.

As clearly indicated the same power source 36 is alternatively used for both bridges. A motor 37 for the second bridge is under the control of a galvanometer 38 connected across the points 27, 35.

In the second bridge a hand adjustable resistance FF has substantially the same resistance value as F2. In fact under zero flow conditions the values of F, F1, FF, and F2 should be equal.

A time motor driven cam 100 continuously reciprocates a switch 101 alternatively connecting the power source 36 into the two bridges. When either bridge is not connected to the power source 36 the galvanometer of that bridge remains at its neutral position and the various resistance values remain unchanged until the power source 36 is again connected to that bridge.

Figure 5:
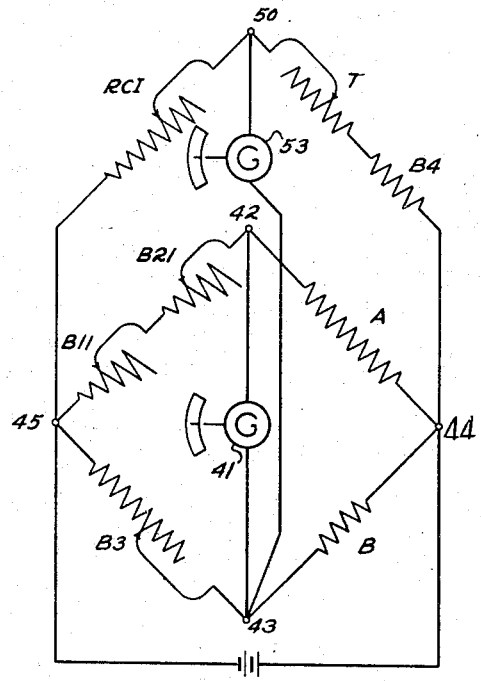

It will now be observed that the resistance B11 is representative of the value $d_{12A}$ while the resistance B21 is representative of the value $d_{13A}$. To determine the mean density of the fluid through the conversion section 15 ($md_{15}$) I obtain the average of the ratios of heads (Equation 5) and accomplish this by including the resistances B11 and B21 in a third bridge circuit (Fig. 5). In this bridge circuit the value of the fixed resistance A is twice that of the value of the fixed resistance B. The adjustable resistance B3 is varied by the positioning of an arm 39, through the agency of a motor 40, under the control of a galvanometer 41.

$$\frac{B3}{B} = \frac{(B11+B21)}{A}$$

$$B3 = \frac{(B11+B21)B}{A}$$

but $$A = 2B$$

and $$B3 = \frac{B11+B21}{2}$$

$$= md_{15}$$

The arm 39 will then indicate, relative to the index 46, the value of $md_{15}$ and the value of the resistance B3 will be representative of $md_{15}$.

In designing the apparatus I incorporate an average expected value of specific gravity or density of the fluid at the orifice 5 in the resistance RC or the motion of the arm 8. Additionally I provide a hand adjusted rheostat 47 for taking care of variations in density of the fluid at the orifice 5 which may occur from time to time.

Figure 7:
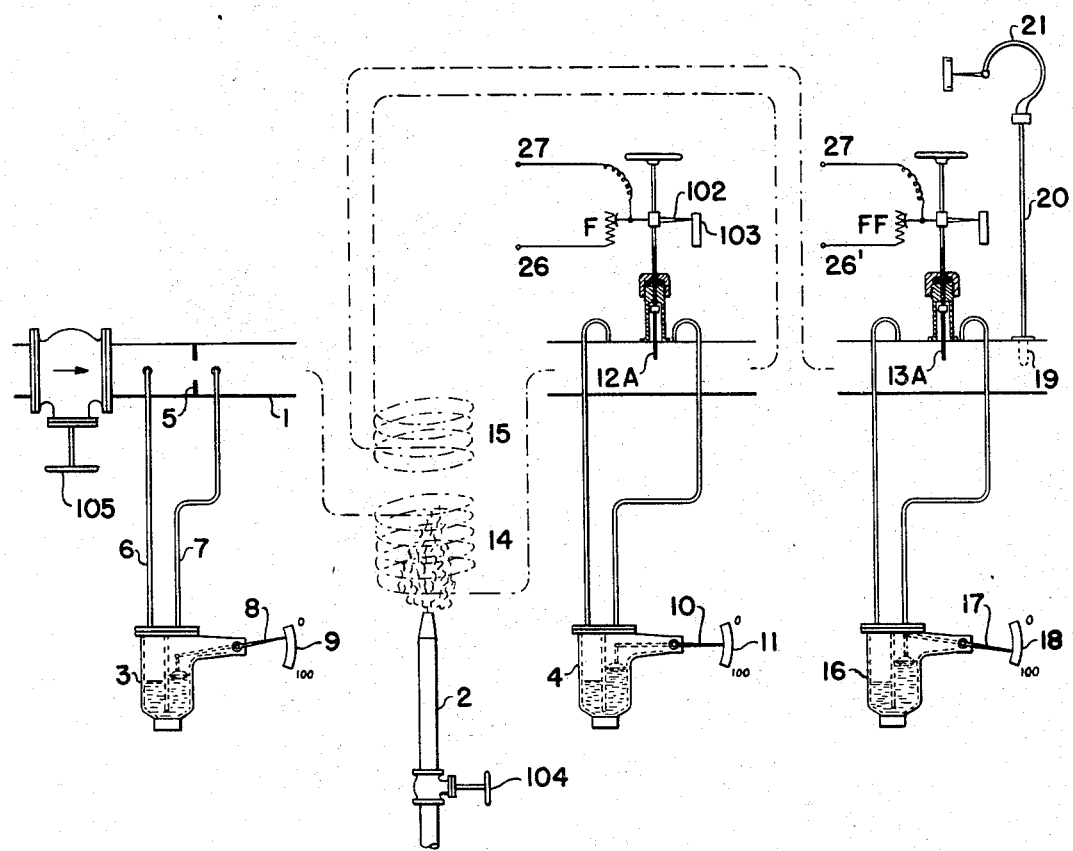
Fig. 7 is a diagrammatic arrangement similar to Fig. 2 but showing certain modifications thereof.

In similar fashion I design into the apparatus the expected value of $cfD^2$ in connection with the resistance RI and also for the expected value of $cfD^2$ in conection with the resistance RO. The auxiliary resistance F is moved by hand when a change in the $cfD^2$ value for the orifice 12A is made by the adjustable means provided. In the same manner, if the adjustable orifice 13A is moved to a new position and value of $cfD^2$, the resistance FF is correspondingly varied. The resistances F, FF may be provided with indexes graduated to read in $cfD^2$ values for the corresponding orifice, or in fact they may be so connected as to be moved simultaneously by and with the means provided for moving the adjustable orifices. Reference to Fig. 7 will show that the stem of the adjustable orifice 12A is provided with an indicator 102 movable relative to an index 103 which may be graduated in $cfD^2$ values; and that the stem also carries a contact movable along the resistance F. In like manner the arrangement in connection with the adjustable orifice 13A is shown in Fig. 7. Thus at any time the position of an orifice 12A or 13A is varied, the necessary corresponding variation in the resistance value F or FF may be simultaneously accomplished.

The arm 8 is adapted to vary a resistance RC1 proportional to $\sqrt{h_5}$ which so long as $d_5$ remains constant equals W, where W is rate of flow in pounds per unit of time. This value is then included as an arm in a Wheatstone bridge circuit (Fig. 5) including the resistance B3, the fixed resistance B, an equal fixed resistance B4 and an adjustable resistance T, to determine the time of detention of any particle of fluid in the heating section 15.

$$\frac{RC1}{T+B4} = \frac{B3}{B}$$

$$T = \left(B \times \frac{RC1}{B3}\right) - B4$$

where $$B4 = B$$
$$RC1 = \sqrt{h_5} = W$$
$$B_3 = md_{15}$$

and $$T_x = \frac{V md_{15}}{W} = \frac{1}{T}$$

where $T_x$ = time any particle is in section 15.
$V$ = volume between 12A and 13A (cu. ft.)
$md_{15}$ = mean density (lbs. per cu. ft.)
$W$ = rate of flow (lbs. per unit T)

The resistance T is varied through movement of an arm 51 positioned by a motor 52, under the control of a galvanometer 53. An index 54 may be graduated to read directly in value of time of detention of any particle in the section 15. In order that the resistance RC1 will represent the value of W or rate of flow in pounds per unit of time the resistance 25 is shaped according to the $\sqrt{h_5}$.

Figure 6:
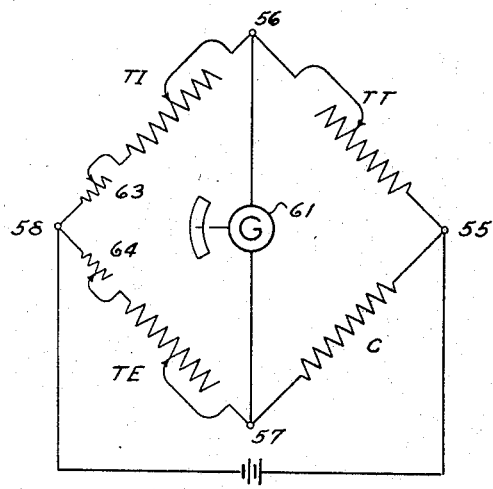

With the resistance T, is varied a resistance T1, representative of time of detention, and this is incorporated in a bridge circuit (Fig. 6) in relation to a resistance TE, representative of value of temperature, positioned by the Bourdon tube 21. The bridge circuit of Fig. 6 includes a resistance TT varied by an arm 59 moved by a motor 60, under the control of a galvanometer 61 for advising desired ratio or relation between time and temperature represented respectively by T1 and TE. This relationship may be continuously recorded as at 62. Hand adjustable rheostats 63, 64 allow adjustment for constants of time and temperature as may become necessary.

In Fig. 7, previously referred to, the valve 104 in the fuel supply line 2 controls the heating, while the valve 105 in the conduit 1 controls the weight rate of flow of fluid to be treated either or both of these values may be manipulated by hand from indications of density, mean density, time of detention, time-temperature relation, or in fact from any of the indications previously referred to in connection with Figs. 1–7, inclusive.

Figure 8:
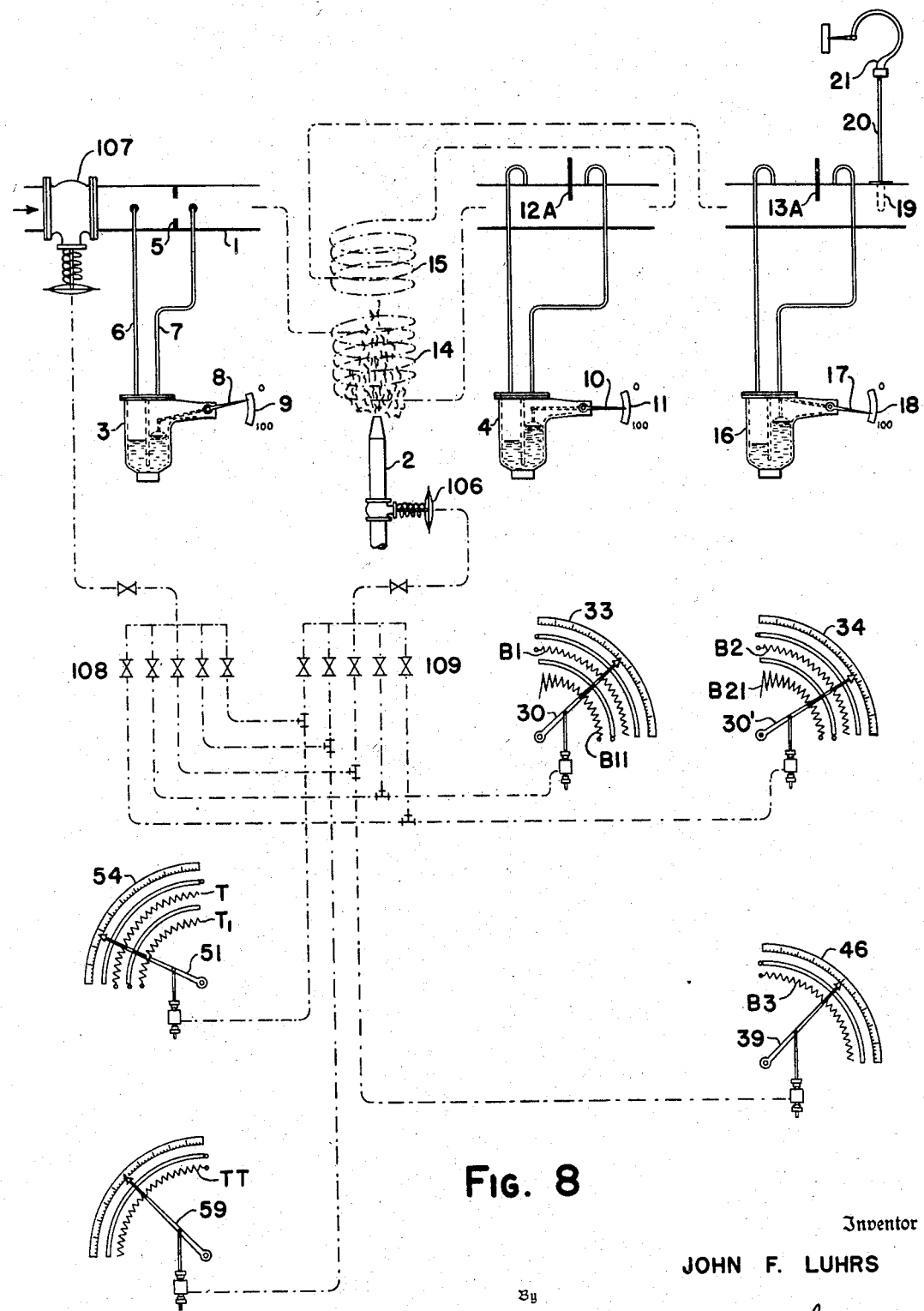
Fig. 8 illustrates in diagrammatic manner a composite of Figs. 2 and 3 including automatic control provisions.

In Fig. 8, I illustrate a composite of Figs. 2 and 3 in which the arms 30, 30', 51, 39, or 59, each position an air pilot valve of the general type disclosed and claimed in the Johnson Patent No. 2,054,464 to establish an air loading pressure representative of density, mean density, etc. In Fig. 8 the fuel control valve 106 and the flow control valve 107 are spring loaded diaphragm-actuated valves responsive to any or all of the air loading pressures established by the pilot valves, through hand selecting valves 108 or 109, thus I may automatically control the flow and/or heating responsive to determined density or any of the variables mentioned.

Figures 9, 11:
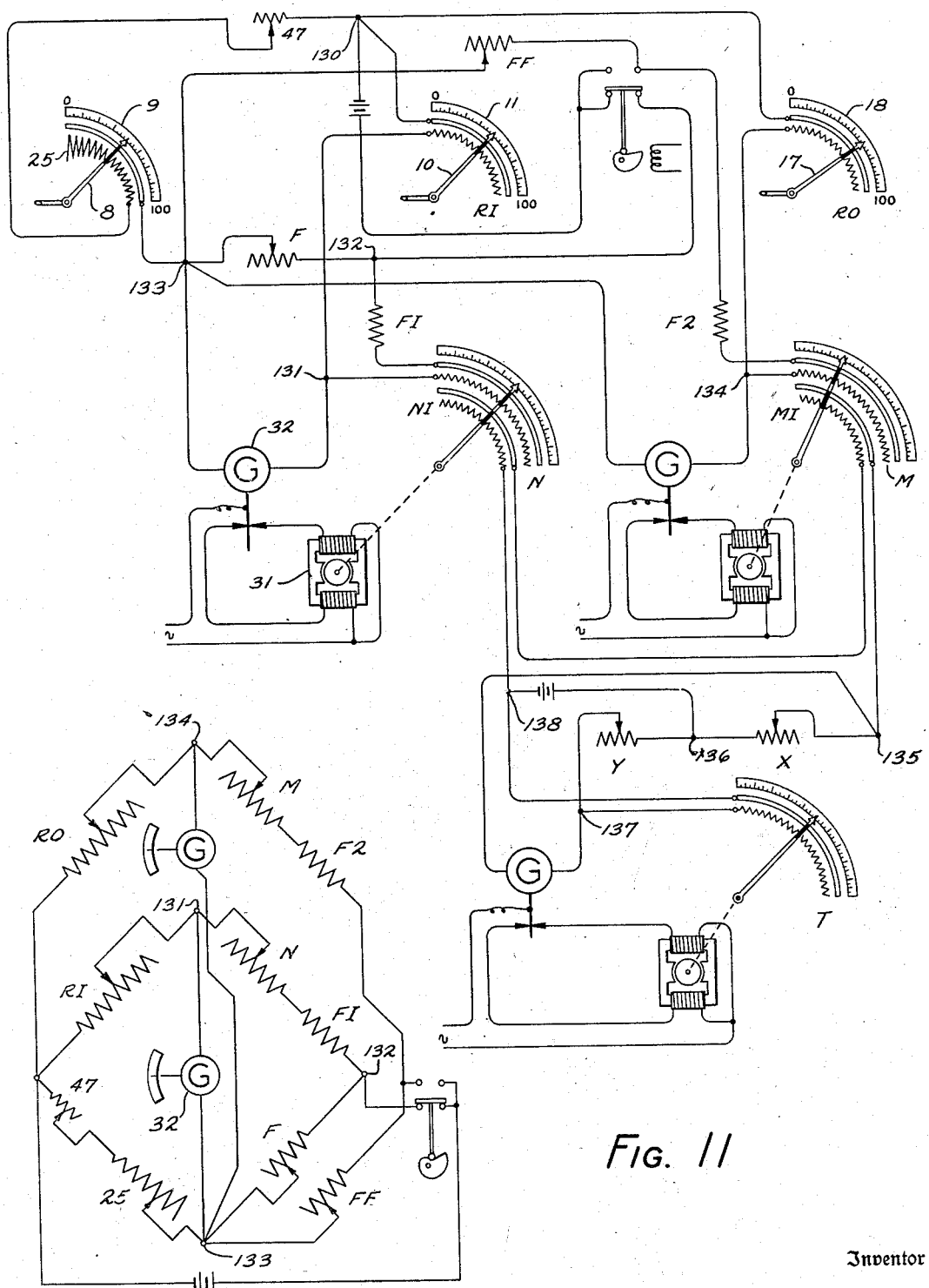
Fig. 11 is a diagrammatic arrangement of the invention similar to Fig. 3 but illustrating a further embodiment.

In Fig. 11 I illustrate a further arrangement to obtain a manifestation of time of detention or treatment. The charge meter 3 positions the arm 8 relative to a shaped or graduated resistance 25 to provide an impedance representative of $\sqrt{h_5}$ or W, i. e. the shape of the resistance winding corrects for the quadratic relation between differential head $h_5$ across the orifice 5 and weight rate of flow W. The value of the impedance or electrical resistance 25 in one leg of the Wheatstone bridge of Fig. 9 is then proportional to W the weight rate of fluid flow through the treating system.

In Figs. 9 and 11 the impedance values of RI and RO are respectively representative of $h_{12A}$ and $h_{13A}$. The bridges of Fig. 9 alternately solve for values N and M in manner similar to that described in connection with Fig. 3. Moved with N is an impedance N1 representative of $W/h_{12A}$ and moved with M is an impedance M1 representative of $W/h_{13A}$.

Figure 10:
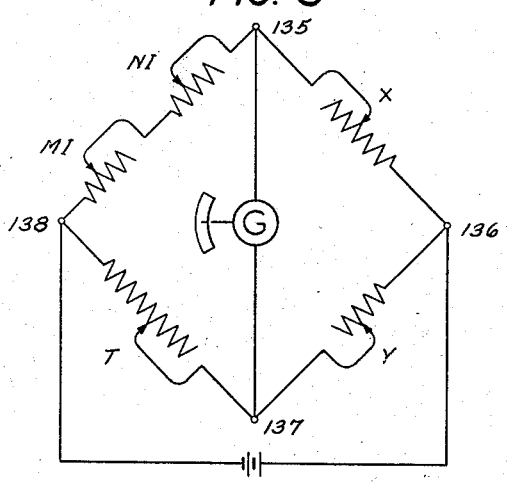
Figs. 9 and 10 are simplified wiring diagrams of the composite wiring of Fig. 11.

The two are algebraically added through the bridge of Fig. 10 to determine time of detention or treatment T, from:

$$W = 360 \, cfD^2 \sqrt{h_5 d_5}$$
$$= K_5 \sqrt{h_5 d_5}$$
$$d_{12A} = d_5 \frac{K_5^2}{K_{12A}^2} \times \frac{h_5}{h_{12A}}$$
$$W_{13A} = W_5 = K_{13A} \sqrt{h_{13A} d_{13A}}$$
$$d_{13A} = d_5 \frac{K_5^2}{K_{13A}^2} \times \frac{h_5}{h_{13A}}$$

and $$md_{15} = \frac{d_{12A} + d_{13A}}{2} = \frac{d_5}{2}\left(\frac{K_5^2 h_5}{K_{12A}^2 h_{12A}} + \frac{K_5^2 h_5}{K_{13A}^2 h_{13A}}\right)$$

$$T = \frac{V md_{15}}{W}$$

$V$ = volume (a constant)

$$W = K_5 \sqrt{h_5 d_5}$$

$$T = \frac{V}{2}\left[\frac{W}{K_{12A}^2 h_{12A}} + \frac{W}{K_{13A}^2 h_{13A}}\right]$$

or $$T = M_1 + N_1$$

where $$\frac{V}{2}, K_{12A}^2 \text{ and } K_{13A}^2$$

are taken care of by F, FF, X and Y.

It will therefore be seen that through the arrangement of Figs. 9, 10 and 11 it is not necessary to first solve for $d_{12A}$ and $d_{13A}$ (as in Fig. 3) to obtain a manifestation of time. Obviously, the time value or position of Fig. 8 may be either that of Fig. 3 or that of Fig. 11.

While I have chosen to illustrate and describe the functioning of my invention in connection with the heating of petroleum or hydrocarbon oil, it is to be understood that the method and apparatus is equally applicable to the treatment, processing, or working of other fluids, such for example, as in the vaporization of water to form steam.

This application constitutes a continuation-in-part of my application Serial No. 152,857 filed July 9, 1937, now Patent No. 2,217,639 dated Oct. 8, 1940.

What I claim as new, and desire to secure by Letters Patent of the United States, is:

1. In a fluid heater having a fluid path, means for exhibiting the relationship between the temperature at a point in the fluid path and the passage time of the fluid between two points in the path, comprising in combination, means in said fluid path at the entrance to the heater, and at each of the points to measure the velocity of flow, impedances varied by each of said last named means, a first Wheatstone bridge including an impedance responsive to velocity of flow at the entrance to said heater, an impedance responsive to velocity of flow at one of the points, and a balancing impedance; a second Wheatstone bridge including an impedance responsive to velocity of flow at the entrance to said heater, an impedance responsive to velocity of flow at the other of said points, and a balancing impedance; automatic means for varying said balancing impedances to maintain said bridges in balance, a third Wheatstone bridge including impedances proportional to said two balancing impedances in one leg and a balancing impedance in another leg, a fourth Wheatstone bridge including an impedance proportional to the last named balancing impedance, an impedance varied by the said means measuring the velocity of flow at the entrance to the heater, and a balancing impedance, automatic means for varying said balancing impedance to maintain said fourth Wheatstone's bridge in balance, a fifth Wheatstone bridge including an impedance proportional to the last named variable impedance and an impedance varied in accordance with the temperature of the fluid at a point in said path, and a balancing impedance; automatic means for varying said balancing impedance to maintain the fifth Wheatstone bridge in balance; and an indicating element positioned by said last named means.

2. In a fluid treating system having a once through fluid path wherein the weight rate of flow at all points in the path is the same and means for heating a section of said path, means for determining the time of treatment of the fluid comprising in combination, means for obtaining an electrical effect representative of weight rate of fluid flow, means for obtaining an electrical effect representative of the mean fluid density through the treating zone, and electrical means for solving the equation $$T = \frac{Vmd}{W}$$

where T is time of detention, V is the volume of the treating zone, $md$ is the mean density of the fluid and W is the weight rate of flow.

3. In a fluid treating system having a once through fluid path wherein the weight rate of flow at all points in the path is the same and means for heating a section of said path, means for determining the time of treatment of the fluid comprising in combination, means for obtaining an electrical effect representative of weight rate of fluid flow, means for obtaining an electrical effect representative of differential pressure $h_I$ across an orifice at the inlet to the treating zone, means for obtaining an electrical effect representative of differential pressure $h_0$ across an orifice at the outlet of the treating zone, and electrical means for solving the equation $$T = \frac{V}{2}\left(\frac{W}{h_I} + \frac{W}{h_0}\right)$$

where T is time of detention, V is the volume of the treating zone, and W is the weight rate of flow.

4. The method of controlling the operation of a fluid heater having a once through flow path, which includes, establishing electrical impedance values each representative of a variable condition of the flowing fluid, continuously interrelating such values and thereby determining an electrical impedance value representative of the time of detention of the fluid in the heater, utilizing such determined value in ascertaining the time of detention of the fluid in the heater, establishing an optimum time of detention for the fluid in the heater, and so controlling the heating by use of the ascertained actual time of detention as to maintain the desired optimum time of detention.

5. The method of operating a fluid treating system having a once through fluid flow path, which includes, establishing electrical impedance values each representative of a variable condition of the flowing fluid, continuously interrelating such values and thereby establishing an electrical impedance value representative of the time of detention of the fluid in the path while being treated, utilizing such value in ascertaining the time of detention of the fluid in the treating zone, establishing an optimum time of detention for the fluid in the treating zone, and so controlling the rate of fluid flow through the path by use of the ascertained actual time of detention as to maintain the desired optimum time of detention.

6. The method of controlling the operation of a fluid heater having a once through fluid flow path, which includes, establishing electrical impedance values each representative of a variable condition of the flowing fluid, continuously interrelating such values and thereby determining an electrical impedance value representative of the time of detention of the fluid being heated, utilizing such determined value in ascertaining the time of detention of the fluid in the heater, establishing an optimum time of detention for the fluid in the heater, and so controlling both the heating and the rate of fluid flow through the path by use of the ascertained actual time of detention as to maintain the desired optimum time of detention.

7. The method of operating a fluid treating system having a once through fluid flow path, which includes, establishing electrical impedance values each representative of a variable condition of the flowing fluid, continuously interrelating such values and thereby establishing an electrical impedance value representative of the time of treatment of the fluid, treating the flowing fluid by varying its heat content, utilizing such determined value in ascertaining the time of detention of the fluid in the treating zone, establishing an optimum time of detention for the fluid in the treating zone such as to result in desired heat content in the leaving fluid, and so controlling the heat content of the fluid by use of the ascertained actual time of detention as to maintain the desired optimum time of detention and consequently the desired optimum heat content of the fluid leaving the treating system.

8. In a fluid heating system having a forced circulation fluid flow path wherein the weight rate of flow at all points in the path is the same and means for heating a section of said path, means for determining the time of treatment of the fluid comprising in combination, means continuously establishing an electrical impedance value representative of weight rate of fluid flow, means continuously establishing an electrical impedance value representative of the mean fluid density through the treating zone, and a Wheatstone bridge circuit continuously solving the equation $$T = \frac{Vmd}{W}$$

where T is time of detention, V is the volume of the treating zone, $md$ is the mean density of the fluid and W is the weight rate of flow.

9. In a fluid heating system having a forced circulation fluid flow path wherein the weight rate of flow at all points in the path is the same and means for heating a section of said path, means for determining the time of treatment of the fluid comprising in combination, means continuously establishing an electrical impedance value representative of weight rate of fluid flow, means continuously establishing an electrical impedance value representative of differential pressure $h_I$ across an orifice at the inlet to the treating zone, means continuously establishing an electrical impedance value representative of differential pressure $h_o$ across an orifice at the outlet of the treating zone, and a Wheatstone bridge circuit continuously solving the equation $$T = \frac{V}{2}\frac{W}{h_I} + \frac{W}{h_o}$$

where T is time of detention, V is the volume of the treating zone and W is the weight rate of flow.

10. Apparatus for controlling the operation of a fluid treating system having a forced circulation fluid flow path comprising in combination, means continuously establishing an electrical impedance value representative of the time of detention of the fluid in the treating zone, means for heating the fluid as it flows through the treating zone to maintain the condition of the fluid at optimum, and control means continuously positioning the heating means responsive to the first named means.

11. Apparatus for controlling the operation of a fluid treating system having a forced circulation fluid flow path comprising in combination, means continuously establishing an electrical impedance value representative of the time of detention of the fluid in the treating zone, means for heating the fluid as it flows through the treating zone to maintain the condition of the fluid at optimum, and control means continuously regulating the weight rate of fluid flow through the treating zone responsive to the first named means.

12. The method of controlling the operation of a fluid heater having a once through flow path, which includes, establishing electrical impedance values each representative of a variable condition of the flowing fluid, continuously interrelating such values and thereby establishing an electrical impedance value representative of the time of detention of the fluid in the heater, establishing an optimum time of detention for the fluid in the heater, and so controlling the heating by use of the established actual electrical impedance value as to maintain the desired optimum time of detention.

13. The method of operating a fluid treating system having a once through fluid flow path, which includes, establishing electrical impedance values each representative of a variable condition of the flowing fluid, continuously interrelating such values and thereby establishing an electrical impedance value representative of the time of detention of the fluid in the path while being treated, establishing an optimum time of detention for the fluid in the treating zone, and so controlling the rate of fluid flow through the path by use of the established actual electrical impedance value as to maintain the desired optimum time of detention.

14. The method of controlling the operation of a fluid heater having a once through fluid flow path, which includes, establishing electrical impedance values each representative of a variable condition of the flowing fluid, continuously interrelating such values and thereby establishing an electrical impedance value representative of the time of detention of the fluid being heated, establishing an optimum time of detention for the fluid in the heater, and so controlling both the heating and the rate of fluid flow through the path by use of the established actual electrical impedance value as to maintain the desired optimum time of detention.

15. The method of operating a fluid treating system having a once through fluid flow path, which includes, establishing electrical impedance values each representative of a variable condition of the flowing fluid, continuously interrelating such values and thereby establishing an electrical impedance value representative of the time of treatment of the fluid, establishing an optimum time of detention for the fluid in the treating zone such as to result in desired heat content in the leaving fluid, and so controlling the heat content of the fluid by use of the established actual electrical impedance value as to maintain the desired optimum time of detention and consequently the desired optimum heat content of the fluid leaving the treating system.

JOHN F. LUHRS.

Certificate of Correction

Patent No. 2,286,864. June 16, 1942.

JOHN F. LUHRS

It is hereby certified that errors appear in the printed specification of the above numbered patent requiring correction as follows: Page 2, second column, lines 61 to 63, for $$=\frac{d_5\frac{h_5}{h_{12A}}+\frac{h_5}{h_{13A}}}{2}$$

read $$=d_5\frac{\frac{h_5}{h_{12A}}+\frac{h_5}{h_{13A}}}{2}$$

page 5, first column, lines 51 and 52, for "treated either or both of these values" read *treated. Either or both of these valves;*
and that the said Letters Patent should be read with these corrections therein that the same may conform to the record of the case in the Patent Office.

Signed and sealed this 8th day of September, A. D. 1942.

[SEAL]

HENRY VAN ARSDALE,
*Acting Commissioner of Patents.*